United States Patent Office

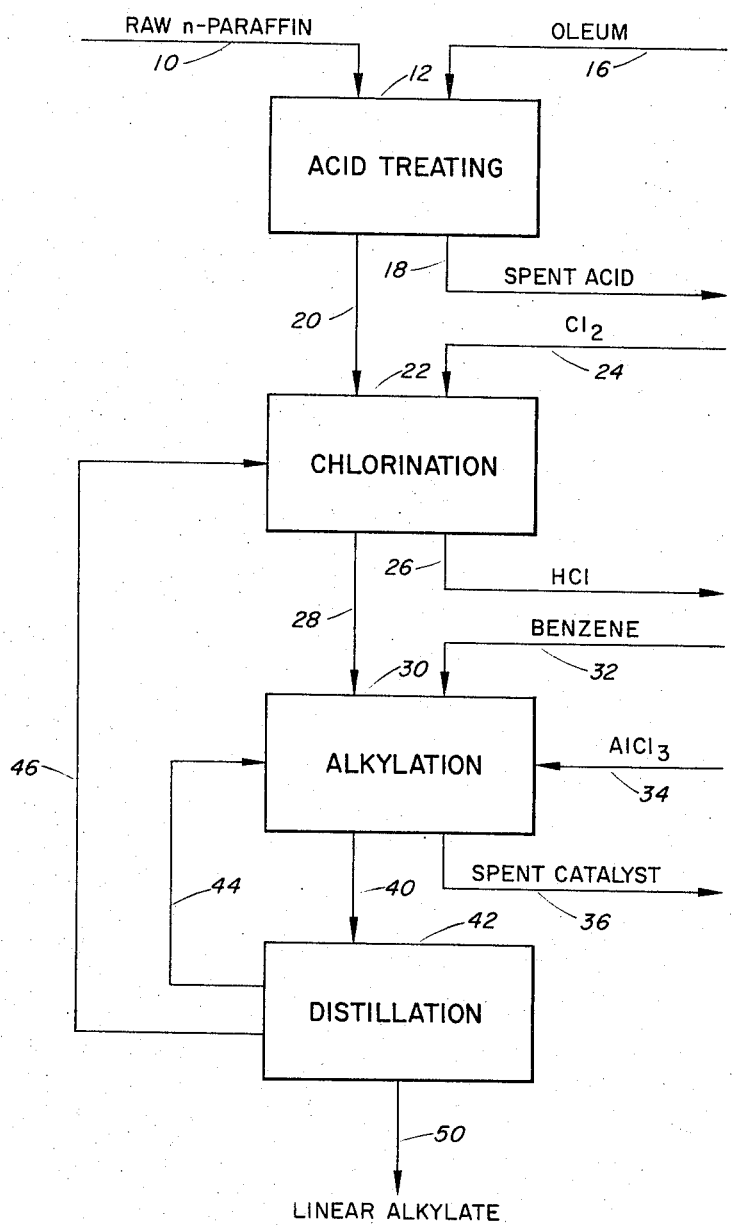

3,365,508
Patented Jan. 23, 1968

3,365,508
BENZENE ALKYLATION WITH CHLOROPARAFFINS
Brij Lal Kapur, Paterson, N.J., and Buddy D. Ratliff, Ponca City, Okla., assignors to Continental Oil Company, Ponca City, Okla., a corporation of Delaware
Filed Mar. 15, 1965, Ser. No. 439,767
6 Claims. (Cl. 260—671)

This invention relates to the preparation of linear alkylbenzene by the alkylation of benzene with monochloro-n-paraffin. Particularly the invention relates to alkylate containing essentially no chlorohydrocarbon constituents.

In the search for more readily biodegradable alkylbenzene sulfonate detergents, the industry has turned to the linear alkylbenzenes (really secondary alkylbenzenes) and principally these are made by reacting benzene with monochloro-n-paraffin. The n-paraffin which is chlorinated to the monochloro-n-paraffin is derived from petroleum. A distillate, e.g. kerosene, is physically separated to obtain an n-paraffin fraction.

It has been observed that all the chlorohydrocarbon present in the monochloro-n-paraffin charged to alkylation is not consumed. The unreacted material can be recycled in so far as it can be distillatively separated from the linear alkylbenzene (LAB) product. However some of the unreacted chlorohydrocarbons, end up in the LAB product and eventually in the sulfonate detergent. The presence of chlorohydrocarbons in the detergent is undesirable.

It has been observed that the amount of unreacted chlorohydrocarbons builds up in a recycle operation and has an adverse effect on the conversion of the other chloroparaffins.

Investigation of this phenomenon has led to the opinion that cyclic hydrocarbons, especially the aromatic hydrocarbons, present in the raw n-paraffin in only contamination amounts, are the cause of the unreacted chlorohydrocarbon problems.

An object of the invention is a linear alkylbenzene, from chloroparaffin-benzene alkylation, which is essentially free of residual chlorohydrocarbon.

An especial object of the invention is a process for producing this essentially chlorine free linear alkylbenzene.

Other objects will become apparent in the course of the description of the invention.

The single figure is a block diagram of the process of the invention.

The process of the invention is an improvement on the conventional process where raw n-paraffins containing cyclic hydrocarbon contaminants are chlorinated to obtain a mixture of chloroparaffins having essentially only one chlorine atom per paraffin molecule and unreacted n-paraffin—other chlorohydrocarbons are also present. This mixture is reacted with benzene in the presence of a Friedel-Crafts catalyst, to produce a linear alkylbenzene (LAB) product mixture including LAB, unreacted benzene, n-paraffins, and a substantial amount of unreacted chlorohydrocarbons. This product mixture is distilled to separate n-paraffins, and unreacted benzene, along with some chlorohydrocarbons, and these constituents are recycled to the appropriate operation.

It has been discovered LAB can be obtained essentially free of chlorohydrocarbons, i.e., the chlorohydrocarbons in the chloroparaffin feed are essentially completely reacted in the alkylation reaction, by treating the raw n-paraffins with oleum in an amount of about 5–50 weight percent based on raw paraffin, at a temperature of about 70°–150° F., neutralizing the treated paraffin and charging the neutral n-paraffin to the chlorination operation.

One embodiment of the process of the invention is described in connection with the figure which forms a part of this specification.

The feed to the process is normally a mixture of n-paraffins. The raw n-paraffin feed is derived from a petroleum distillate which distillate is physically separated into an n-paraffin fraction contaminated with cyclic hydrocarbons particularly aromatic hydrocarbons. The n-paraffin feed may be obtained by separation using molecular sieves or by urea extraction. In both these processes some cyclic hydrocarbons will be present in the n-paraffin product. It may be desirable to treat the distillate to remove materials which will react with the urea or the zeolite. For detergent manufacturers the n-paraffin has 10–18 carbon atoms; typical materials have 10–12 carbon atoms and 13–15 carbon atoms. The raw n-paraffin feed is passed by way of line 10 into acid treating zone 12. In zone 12 the raw n-paraffin is treated with oleum from line 16. The term "oleum" includes 100% sulfuric acid and 100% sulfur trioxide. Commonly the process utilizes 10–30% oleum.

Acid treating zone 12 may be any form of operation for carrying out the reaction of hydrocarbon with oleum. Spent acid sludge is shown as being withdrawn by way of line 18. Zone 12 also includes any conventional neutralization procedure for the sour oil. The neutralization may be carried out by aqueous caustic or by clay filtration of the sour oil. The oleum treating is commonly carried out at a temperature of about 70°–150° F. and more usually about 100°–130° F. The amount of oleum used should be at least enough to remove essentially all the aromatic hydrocarbons. In general the usage of oleum is in the range of about 5–50 weight percent based on raw n-paraffin charged. When 10–30% oleum is used as the treating agent the usage usually is about 10–30 weight percent. It is to be understood that the usage of oleum will be dependent not only on the amount of cyclic hydrocarbon contained but also on the concentration of the oleum and the temperature of treating.

The neutral n-paraffin is passed from zone 12 by way of line 20 to chlorination zone 22. Herein chlorine gas ($Cl_2$) is introduced by way of line 24. The chlorination reaction produces by-product hydrogen chloride which is withdrawn by way of line 26. The chlorination reaction is carried out under conventional conditions controlled to produce monochloro-n-paraffins in admixture with n-paraffins (some of the cyclic hydrocarbons present in the neutral paraffin will also be chlorinated).

The mixture of n-paraffins and chlorohydrocarbons is passed from zone 22 by way of line 28 into alkylation zone 30. Benzene is passed by way of line 32 into zone 30; at least enough benzene is charged to theoretically react with all the chlorohydrocarbons to form linear alkylbenzene; usually a large excess is present. The alkylation reaction in zone 30 is a conventional operation using Friedel-Crafts catalyst; herein the catalyst is aluminum chloride which is introduced by way of line 34. Spent catalyst is periodically withdrawn by way of line 36. It is to be understood that zone 30 includes facilities for removing residual catalyst, e.g., acid treating and caustic washing.

In alkylation zone 30 there is produced a mixture of LAB, n-paraffins, unreacted benzene and usually some unreacted chlorohydrocarbons. The LAB product mixture is passed from zone 30 by way of line 40 into distillation zone 42. In distillation zone 42 the LAB product mixture is separated. Unreacted benzene is recycled by way of line 44 to alkylation zone 30. A recycle stream of n-paraffins is passed by way of line 46 to chlorination zone 22. A linear alkylate product stream is withdrawn from zone 42 by way of line 50. Usually each of streams benzene, line 44; n-paraffin, line 46; and alkylate, line 50, contains some unreacted chlorohydrocarbon. However, in the process of the invention essentially all of the chlorohydrocarbons present in line 28 are reacted in zone 30; the alkylate product in line 50 is essentially free of chlorohydrocarbon.

The term "essentially free of chlorohydrocarbon" is to be understood to mean acceptable in that sense by the manufacturers of linear alkylbenzene sulfonate detergent.

In a particular embodiment of the invention a kerosene fraction containing n-paraffins having 10–15 carbon atoms is treated with molecular sieves to produce an n-paraffin fraction containing about 5% of cyclic hydrocarbons. The raw n-paraffin fraction is treated with 20% oleum at 120° F. in an amount of 25 weight percent based on raw n-paraffin. The sour oil is neutralized with caustic and then water washed to produce a neutral paraffin containing less than 0.1% of aromatic hydrocarbons. The neutral n-paraffins are chlorinated with chlorine gas using 20–30 mole percent of chlorine; approximately 20–33% of n-paraffin is converted to monochloro-n-paraffin. The mixture of chloroparaffin and paraffin is reacted with benzene using aluminum chloride catalyst to produce LAB. The LAB product mixture is distilled and the unreacted n-paraffin recycled to the chlorination zone. The excess of benzene is recycled to the alkylation zone. The LAB product contains less than 0.05% of chlorine—in general the chlorohydrocarbon conversion is between 99.5 and 99.9%.

ILLUSTRATION I 350 gallons of urea adducted n-paraffins (mol. wt. 165; range $C_{10}$–$C_{13}$; aromatic content 0.7 wt. percent by PONA) were distilled and then oleum treated. The 20% oleum treatment step consisted of treating the n-paraffins with two 5% treats of oleum (245 lbs. of oleum on each treat) at 150° F. (65° C.) and stirring time of 1 hour. After each oleum treatment, the sludge was removed. The final sour oil was filtered through clay.

These paraffins were chlorinated to a mixture of monochloroparaffins and n-paraffins, alkylated and distilled. After the 1st pass, in which chlorinated n-paraffins were consumed, fresh paraffins were added for subsequent passes.

The residual chloride level as wt. percent chlorine and the wt. percent chlorine conversion were:

| Pass | Wt. Percent Cl | Wt. Percent Cl Converted |
|---|---|---|
| 1st | 0.012 | 99.7 |
| 2nd | .014 | 99.5 |
| 4th | .003 | 99.9 |
| 10th | .035 | 99.5 |

The residual chloride level and the wt. percent chlorine conversion of the non-oleum treated sample was:

| Pass | Wt. Percent Cl | Wt. Percent Cl Converted |
|---|---|---|
| 1st | 0.33 | 92.5 |
| 2nd | 0.35 | 90.5 |

This 2nd pass indicates the immediate accumulation of the residual chlorides in non-oleum treated n-paraffins.

ILLUSTRATION II n-Paraffins from kerosene which had been treated with moleculr sieves were chlorinated and alkylated; residual chloride was determined on the benzene-free crude alkylate. Similar information was obtained on a 20% oleum treated, and then clay filtered, paraffin batch; 5 wt. percent at 77° F. (25° C.) for 15 minutes.

Without oleum treatment

Wt. percent Cl
Chlorinated n-paraffin mixture _____ 3.58
Residual chloride in benzene-free crude alkylate __ 0.56
Wt. percent chlorine conversion _____ 84

With oleum treatment
Chlorinated n-paraffin mixture _____ 4.01
Residual chloride, in benzene-free crude alkylate _____ 0.08
Wt. percent chlorine conversion _____ 98

Thus having described the invention, what is claimed is:

1. In the alkylation process where raw n-paraffins are chlorinated to obtain a mixture of n-paraffins and chloroparaffins having essentially only one chlorine atom per paraffin molecule; said mixture is reacted with benzene in the presence of a Friedel-Crafts catalyst to produce linear alkylbenzene, a substantial amount of unreacted chlorohydrocarbons, unreacted benzene and n-paraffins; and the alkylation product is distilled to separate n-paraffins and unreacted benzene which constituents are recycled to the appropriate operation; the improvement which comprises treating raw n-paraffin with oleum in an amount of about 5–50 weight percent based on raw paraffin at a temperature of about 70°–150° F., neutralizing the treated paraffin and charging said neutral paraffin to said chlorination operation, said neutral paraffin feed affording chlorohydrocarbons that are essentially completely reacted in said alkylation operation.

2. A process in accordance with claim 1 where said n-paraffin has 10–18 carbon atoms.

3. A process in accordance with claim 2 where said oleum is 10–30% oleum.

4. A process in accordance with claim 3 where said amount is about 10–30 weight percent.

5. A process in accordance with claim 4 where said temperature is about 120° F.

6. An alkylation process which comprises: oleum treating a raw n-paraffin, having 10–18 carbon atoms, feed contaminated with cyclic hydrocarbons at a temperature of about 100°–130° F. with about 10–30% oleum in an amount of about 10–30 weight percent, based on said feed, to remove essentially all of said contaminant, and neutralizing said treated feed;

charging said treated feed to a chlorination operation wherein a chloroparaffin product mixture of unreacted n-paraffins and essentially only monochloro-n-paraffins is obtained;

charging said chloroparaffin product mixture and benzene, in an amount sufficient to react with said chloroparaffins, in the presence of an aluminum chloride catalyst to obtain a linear alkylbenzene product mixture; and distilling said LAB product mixture to separate n-paraffin and unreacted benzene from LAB product that is essentially free of chlorohydrocarbon.

References Cited

UNITED STATES PATENTS 3,322,843   5/1967   Frandolig et al. _____ 260—676

DELBERT E. GANTZ, *Primary Examiner.*

C. R. DAVIS, *Assistant Examiner.*